Sept. 13, 1966         A. J. MICHAUD           3,272,346
                       SMOKEHOUSE RACK
Filed Jan. 31, 1964                       2 Sheets-Sheet 2
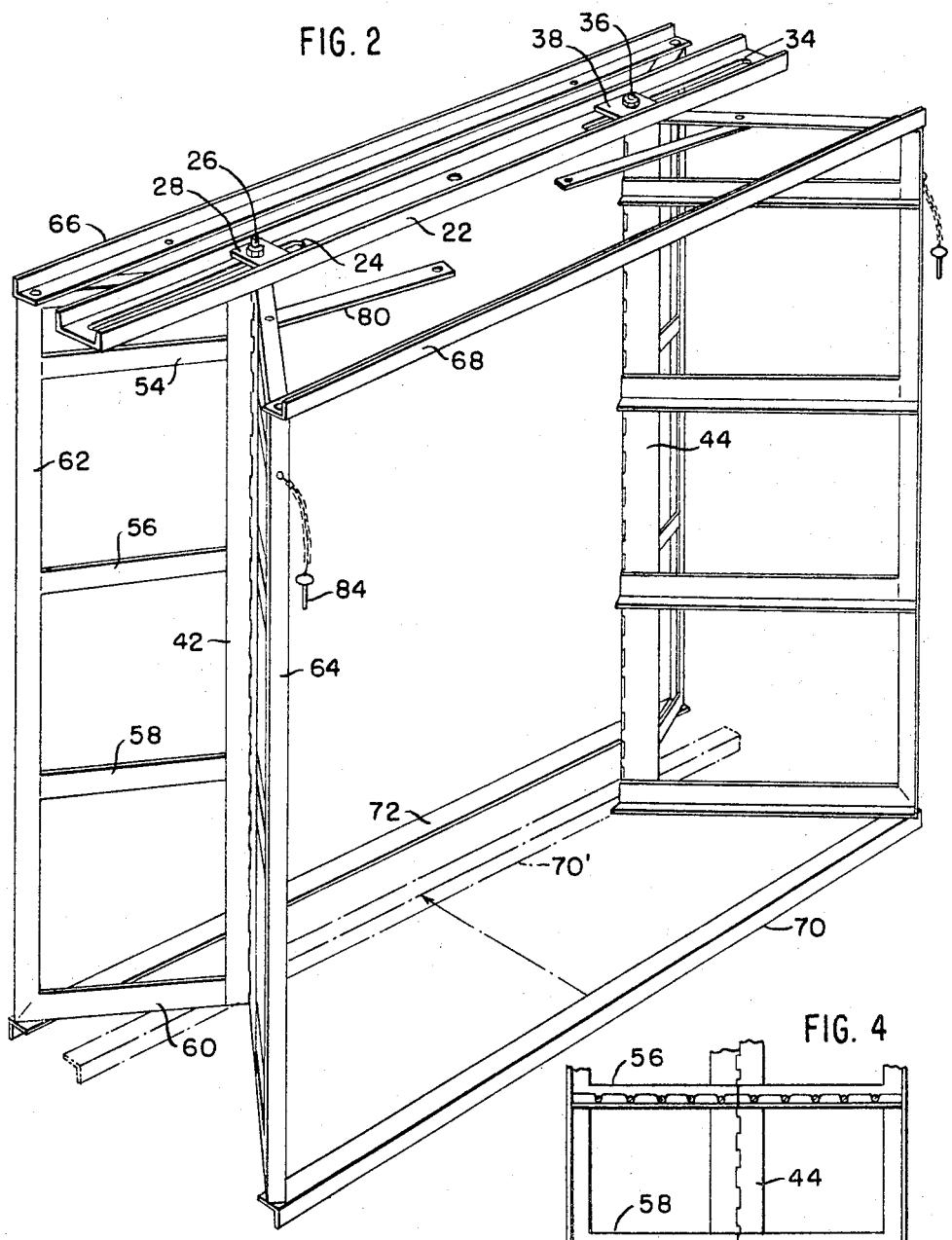
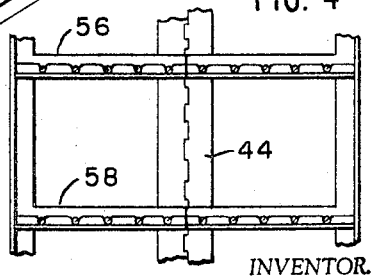
INVENTOR.
ALBERT J. MICHAUD
BY
Kenway, Jenney + Hildreth
ATTORNEYS United States Patent Office 3,272,346
Patented Sept. 13, 1966

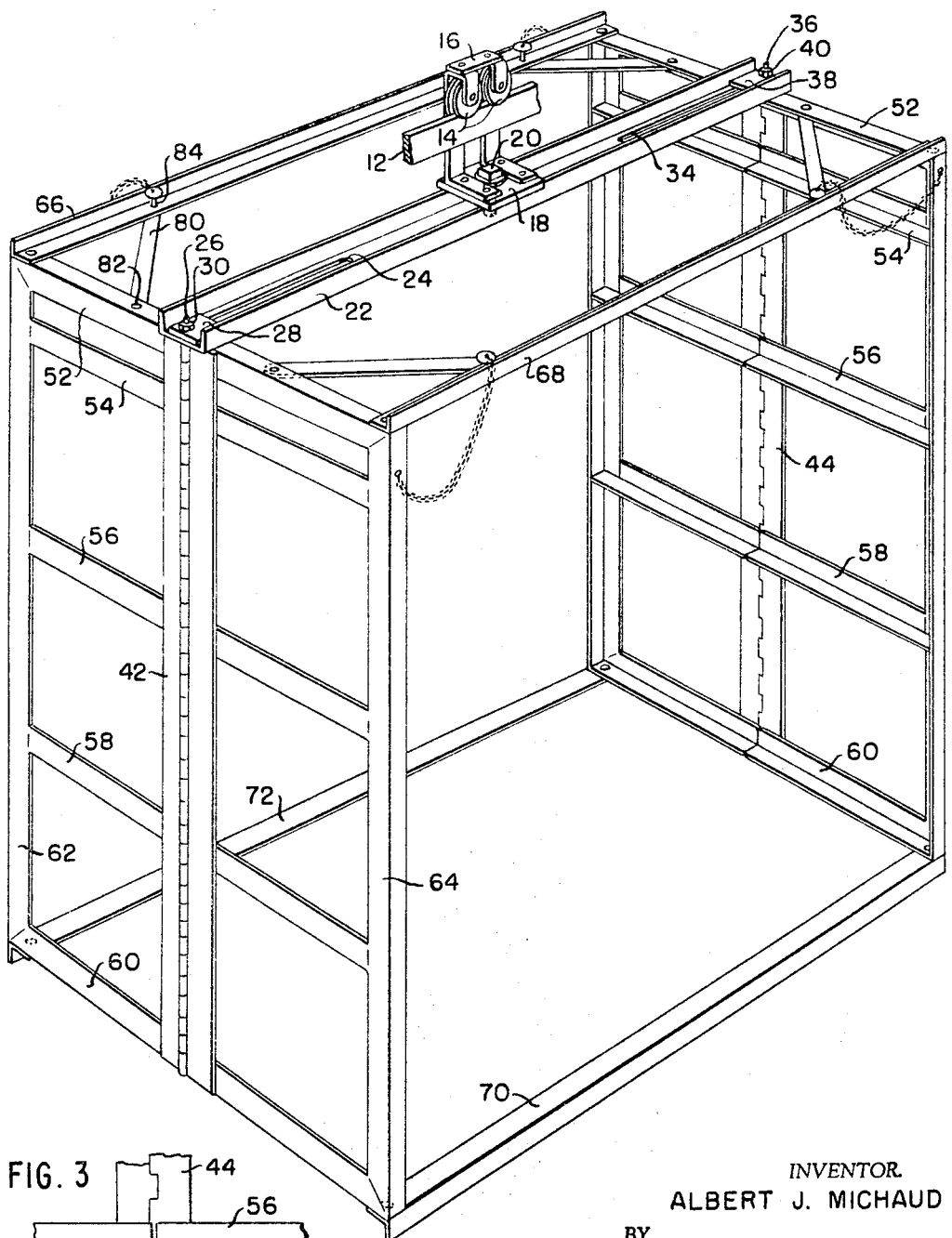

3,272,346
SMOKEHOUSE RACK
Albert J. Michaud, 314 Canal St., Salem, Mass.
Filed Jan. 31, 1964, Ser. No. 341,592
7 Claims. (Cl. 211—118)

This invention relates in general to equipment for the smoking of meat products and in particular to a lightweight, collapsible rack for that purpose.

It is the practice in the meat processing industry generally to provide a smokehouse or stack through or into which meat is carried by means of racks. Frequently, an overhead monorail is used, and the rack is carried on the rail by trolley wheels from which the rack itself is suspended. To accommodate reasonable quantities of meat products, the racks are necessarily quite bulky, and it has long been the practice to provide some means whereby the rack may be dismantled or collapsed when not in use. However, racks which could be collapsed or dismantled for easy storage have almost invariably been made of such heavy and bulky members that the reassembly or erection of the racks requires considerable effort. Moreover, the weight of the rack alone has frequently been such that a single workman cannot lift the rack onto the trolley or rail. Of course, when the rack is loaded with meat products, it is utterly impossible for a single man to handle it.

As an apparently obvious solution to the weight problem, there have been many relatively recent attempts to use lightweight metals such as aluminum in smokehouse racks. Unfortunately, however, when these racks were made collapsible, they lacked the strength and durability necessary for the rather rough, heavy-duty use to which the racks are exposed. Because of this experience, it has been though that one could not achieve the required strength and durability along with collapsibility for easy storage in a rack made of lightweight materials.

It is, therefore, an object of the present invention to utilize lightweight materials in a smokehouse rack without sacrifice of strength or durability.

It is another object of the present invention to simplify the erection and handling of collapsible smokehouse racks.

It is still another object of the present invention to reduce the cost of meat products my simplifying their handling and processing.

A major feature of the present invention which makes practical the use of lightweight material such as aluminum in a smokehouse rack is the structural spine or central frame of the device. This spine first includes a rugged aluminum channel which supports the entire weight of the smokehouse rack and its contents. The channel is suspended from a trolley by a rugged pivot pin or bolt and the inner surface of the channel accommodates sliding plates.

Anchored in the sliding plates are a pair of stainless steel rods which form the pivots or hinge pins of a pair of piano hinges. The piano hinges as another part of the central frame constitute a second major feature of the invention because of their contribution to strength and practical collapsibility of the rack. For a distance adjacent each end of the channel, slots are formed for the passage of the stainless steel hinge rods into the anchoring sliding plates.

Adding to the strength of the rack of the present invention is the design of the various side and end frame members and cross-members which are made of aluminum angles. Also, positive locking members are provided to prevent collapse of the rack when it is in use. For a better understanding of the present invention together with other and further features, advantages and objects, reference should be made to the following detailed description of a preferred embodiment, which should be read in conjunction with the appended drawing in which:

FIG. 1 is a view in perspective of a smokehouse rack built in accordance with the present invention as it appears in erected condition;

FIG. 2 is a view in perspective of the same rack in a partially collapsed condition;

FIG. 3 is a detailed view of the lock bolt for retaining the rack in an erect condition; and FIG. 4 is a fragmentary view of an alternative construction of the rack.

In FIG. 1 there may be seen a monorail 12 which runs through the smokehouse (not shown) and back to the loading and unloading area. A pair of closely spaced trolley wheels 14 ride on the monorail and a frame 16 is carried by the trolley wheels 14. At the bottom of the frame 16 is a base plate 18, through which a heavy pivotal bolt 20 passes. The pivot bolt 20 is preferably made of a material such as Monel metal, and it supports the central frame which includes a relatively heavy aluminum channel 22. In a typical heavy duty rack structure, the channel 22 may be a three-inch channel.

Adjacent each end of the channel 22, a slot is cut. Passing through the slot 24 is a stainless steel rod 26. The end of the rod 26 is threaded, and the threaded end passes through a plate 28 which closely fits the interior of the channel 22. A nut 30 is threaded on the end of the rod 26 and holds it in position in the plate 28. At the other end of the channel 22 a similar slot 34 is cut. A second stainless steel rod 36 passes through the slot 34 and a plate 38 in which it is retained by means of a nut 40.

The rods 26 and 36 form parts of piano hinges 42 and 44, respectively, which complete the central frame. Welded to one side of the piano hinge 42 are a series of cross-members 52, 54, 56, 58 and 60, corresponding cross-members being welded to the other side of the hinge 42. These members are made of aluminum angles, and in a typical construction the dimensions of the angles are 1¾ x 1¼ x ¼ inch. The other ends of the cross-members are welded to a unitary upright side frame member 62 which runs from the top to the bottom of the rack. The corresponding cross-members welded to the other side of the piano hinge 42 run to another upright side frame member 64. Similar upright side frame members and cross-members are connected in the same fashion to the piano hinge 44. Horizontal frame members 66 and 68 are pivotally connected to the top ends of the upright members 62 and 64 and to their counterparts adjacent the piano hinge 44. Horizontal frame members 70 and 72 are pivotally connected to the lower ends of the uprights in the same manner. The pivotal connections may be made with bolts or rivets of stainless steel, aluminum or Monel metal.

At the top four corners of the rack, diagonal braces are provided to retain the rack in an erected position when that is desired. The diagonal brace running between the cross-member 52 and the horizontal side frame member 66 is typical. It consists of a brace 80, pivotally attached to the cross-member 52 by means of a pivot pin 82. The end of the brace 80 opposite the pin 82 is provided with a round opening, and a similar opening is formed in the frame member 66. A quick release pin 84 is dropped through the opening in the frame member 54 and the matching opening in the brace 80. The pin 84 is tapered to permit easy insertion and retraction. To prevent loss of the pin 84, a chain may be attached to the end of the pin and the chain anchored in a manner shown more clearly in a subsequent drawing. Also, as a supplementary or an alternative method of locking the rack in an erected condition, there may be provided a bolt passing beneath the cross-member 56 and the adjacent cross-member which meets the cross-member 56 at the piano hinge 42 and another bolt similarly disposed at the piano hinge 44. Further detail on this locking mechanism appears hereinbelow.

FIG. 2 shows the rack of the present invention in a partially collapsed condition. As is obvious from this drawing, the plates 28 and 38 are moved toward each other along the channel 22 after the braces and bolts are released. The side frames are pivoted by means of the bolts or rivets between upright and horizontal members as noted above.

As the plates are brought toward each other, the upright members collapse toward each other, and the dimension of the rack when it is collapsed is only slightly wider than that of the channel by which it is suspended. Also, the pivotal attachment of the rack to the support plate 18 is such that the rack may be turned through 90° or through any other convenient angle to facilitate compact storage of groups of the racks when they are not in use. The close spacing of the trolley wheels 14 also permits a number of racks to occupy a minimum of space if it is desired to leave them suspended from the rail 12 when they are collapsed.

FIG. 4 shows an alternative structure in which the present invention may be incorporated. The matching cross-members welded to the piano hinges may be slotted at intervals, or a slotted end bar may be fixed to the aluminum angles forming the members. The slots are of proper size to accommodate rods of stainless steel or other suitable non-contaminating metal from which the various meat products may be hung. This alternative structure is particularly useful when smaller products are being passed through the smokehouse on the rack. The supply of the rods is preferably kept available near the loading area of the racks and the rods may be inserted as needed for the specific products being processed.

In FIG. 3 there is shown some detail on the locking bolt which may be used beneath pairs of the cross-members of the end frames. In its simplest form, the lock may consist of a barrel bolt. A rod 90 of aluminum, for example, having one end turned at an angle to provide a finger grip is slidably retained in a pair of U-shaped enclosures 92, which are welded to the cross-member 56. A similar enclosure 94 is welded to the cross-member adjacent the member 56, and the rod 90 when advanced reaches into the enclosure 94 to lock the two cross-members in alignment.

Although what has been disclosed constitutes a preferred embodiment of the present invention, certain modifications and changes will suggest themselves to those skilled in the art upon a reading of the foregoing specification. Such modifications and changes are believed to be within the purview of the present invention, which should, therefore, be limited only by the spirit and scope of the appended claims.

What is claimed is:

1. In meat-processing apparatus which includes a rail and a trolley movable on said rail, a collapsible rack comprising a central frame including a channel having a flat lower surface and an open upper surface, a pivot bolt securing said channel to said trolley, said channel having at least a slot formed substantially centrally along the length thereof to points adjacent the ends thereof, first and second retaining plates slidably disposed in said open upper surface and overlying said slot, first and second piano hinges including first and second rods forming the respective hinge pins thereof, means for retaining ends of said first and second rods in said first and second retaining plates respectively, a pair of side frames each including two upright members parallel to said piano hinges and two horizontal members parallel to said channel, said upright members being pivotally connected to said horizontal members, a plurality of cross-members connected between each said piano hinge and the upright members adjacent thereto, and means for locking said rack in an erected condition with said retaining plates spaced apart at a maximum distance in said channel.

2. In apparatus for processing meat products in which a rail passes through a smokehouse and a trolley is movable along said rail, a collapsible rack for carrying said meat products comprising a central frame which includes a channel having a flat lower surface and an upper surface recessed between the flanges thereof, a pivot bolt connecting said channel to said trolley, said channel having slots formed vertically therethrough adjacent the ends thereof, first and second retaining plates slidably disposed on said recessed upper surface, a first rod connected through one of said slots to said first retaining plate, a second rod connected through the other of said slots to said second retaining plate, a first piano hinge including said first rod as the hinge pin thereof and a second piano hinge including said second rod as the hinge pin thereof, said piano hinges depending from said channel to complete said central frame, first and second side frames parallel to and on either side of said central frame, said side frames including horizontal and upright members, cross-members welded between said piano hinges and upright members adjacent thereto, and means pivotally connecting said upright members to said horizontal members whereby moving of said retaining plates toward one another effects collapsing of said rack.

3. In meat-smoking apparatus wherein a trolley rides upon a track, passing through a smokehouse, a rack comprising an upward facing channel pivotally attached to said trolley, a pair of piano hinges having ends slidably disposed in and suspended from said channel, side frames disposed parallel to and on either side of said channel and said piano hinges, cross-members welded between said piano hinges and said side frames, and means pivotally connecting horizontal and upright members of said side frames whereby movement of the ends of said piano hinges in said channel toward one another effects collapsing of said rack.

4. In apparatus for processing meat products in which a rail passes through a smokehouse and a trolley is movable along said rail, a collapsible rack for carrying said meat products comprising a central frame which includes a channel having a flat lower surface and an upper surface recessed between the flanges thereof, a pivot bolt connecting said channel to said trolley, said channel having slots formed vertically therethrough adjacent the ends thereof, first and second retaining plates slidably disposed on said recessed upper surface, a first rod connected through one of said slots to said first retaining plate, a second rod connected through the other of said slots to said second retaining plate, a first piano hinge including said first rod as the hinge pin thereof and a second piano hinge including said second rod as the hinge pin thereof, said channel and said piano hinges forming three sides of a first rectangle, first and second side frames including horizontal and vertical members of angular cross-section parallel to and on either side of said central frame and forming second and third rectangles similar to said first rectangle, cross-members also of angular cross-section welded between said piano hinges and adjacent vertical members of said second and third rectangles and means pivotally connecting the vertical and horizontal members of said second and third rectangles whereby movement of said retaining plates toward one another in said channel effects collapsing of said rack.

5. In apparatus as defined in claim 4, the further combination therewith of locking members to prevent undesired collapsing of said rack, said locking members comprising at least a diagonal brace detachably connected between a horizontal member of one of said side frames and one of said cross-members.

6. In apparatus as defined in claim 4, the further combination therewith of locking members to prevent undesired collapsing of said rack, said locking members comprising at least a retractable bolt attached to and extending from one of said cross-members across one of said piano hinges and engaged in an adjacent cross-member.

7. In apparatus as defined in claim 4, the further combination therewith of a plurality of rods of length similar to said horizontal members and means associated with each of said cross-members having a plurality of slots formed in the upper surfaces thereof to accommodate the ends of said rods.

References Cited by the Examiner

UNITED STATES PATENTS

| | | | |
|---|---|---|---|
| 2,440,513 | 4/1948 | Kaelin et al. | 211—118 X |
| 2,505,973 | 5/1950 | Julian | 99—259 |
| 2,574,319 | 11/1951 | Cadwallader | 211—118 |
| 2,643,777 | 6/1953 | Pickens | 211—177 X |

FOREIGN PATENTS 500,117   2/1954   Canada.

LOUIS O. MAASSEL, *Primary Examiner.*